United States Patent

Harrison et al.

(10) Patent No.: US 6,743,874 B2
(45) Date of Patent: Jun. 1, 2004

(54) RAPIDLY CROSSLINKING FLUOROPOLYMER

(75) Inventors: David B. Harrison, Leverkusen (DE); Wilhelm-Franz Biener, Bergisch Gladbach (DE)

(73) Assignee: Bayer Aktiengesellschaft, Leverkusen (DE)

(*) Notice: Subject to any disclaimer, the term of this patent is extended or adjusted under 35 U.S.C. 154(b) by 8 days.

(21) Appl. No.: 10/369,009

(22) Filed: Feb. 19, 2003

(65) Prior Publication Data

US 2003/0166807 A1 Sep. 4, 2003

Related U.S. Application Data

(62) Division of application No. 09/979,824, filed on Nov. 26, 2001, now abandoned, which is a continuation of application No. PCT/EP00/04426, filed on May 16, 2000.

(30) Foreign Application Priority Data

May 28, 1999 (DE) .......................... 199 24 439

(51) Int. Cl.$^7$ .............................. C08F 114/18
(52) U.S. Cl. ................. 526/206; 526/222; 526/250
(58) Field of Search .................. 526/206, 250, 526/222

(56) References Cited

U.S. PATENT DOCUMENTS

| 4,243,770 A | | 1/1981 | Tatemoto et al. | 525/331 |
|---|---|---|---|---|
| 4,361,678 A | | 11/1982 | Tatemoto et al. | 528/374 |
| 4,501,869 A | | 2/1985 | Tatemoto et al. | 526/249 |
| 4,973,633 A | | 11/1990 | Moore | 526/247 |
| 5,182,342 A | | 1/1993 | Feiring et al. | 526/206 |
| 5,231,154 A | | 7/1993 | Hung | 526/206 |
| 5,494,984 A | * | 2/1996 | Funaki et al. | 526/206 |
| 5,763,706 A | * | 6/1998 | Tung et al. | 570/167 |
| 5,852,125 A | * | 12/1998 | Kruger et al. | 525/326.2 |
| 5,969,064 A | | 10/1999 | Krüger et al. | 526/204 |
| 6,312,759 B1 | * | 11/2001 | Yamada et al. | 427/131 |

FOREIGN PATENT DOCUMENTS

| DE | 196 40 972 | 4/1998 |
|---|---|---|
| EP | 0 692 501 | 1/1996 |
| EP | 0 811 641 | 12/1997 |
| JP | 60-221409 | 11/1985 |
| WO | 98/15583 | 4/1998 |

OTHER PUBLICATIONS

P. Ferrandez, Stephen Bowers, Gummi Fasern Kunstst. 48 (month unavailable) 1995, pp. 626–633, Viton* IRP —Fluorkautschutktypen mit verbesserten Verarbeitungseigenschaften.

Anestis L. Logothetis, Prog. Polym. Sci., vol. 14, (month unavailable) 1989, pp. 251–296 Chemistry of Fluorocarbon Elastomers.

Chemical Abstracts, vol. 122, No. 16, Apr. 17, 1995, Columbus, OH, US; abstract No. 190156, XP002143452 & JP 06 331040 A (Asahi Chemical Inc) Nov. 29, 1994.

* cited by examiner

*Primary Examiner*—Bernard Lipman
(74) *Attorney, Agent, or Firm*—Joseph C. Gil; Jennifer R. Seng

(57) ABSTRACT

The invention relates to a rapidly cross-linking liquid fluoropolymer that contains as the essential components tetrafluoroethylene and at least one compound from the group consisting of diiodomethane, 1,2-diiodo-1,1-difluoroethane, 1-iodo-2-bromo-1,1-difluoroethane, 1-bromo-2-iodo-1,1-difluoroethane and/or 1,2-dibromo-1,1-difluoroethane that has certain fractions of the final group of the formula —$CH_2$—X with X=Br and/or iodine, and iodine/bromine contents in the range of from 0.05 to 1 wt.-%. and that has a defined molecular weight and viscosity. The invention further relates to a method for producing said fluoropolymer and to its use.

2 Claims, No Drawings

RAPIDLY CROSSLINKING FLUOROPOLYMER

This is a divisional of U.S. patent application Ser. No. 09/979,824 filed on Nov. 26, 2001 now abandoned which is a 371 of PCT/EP00/04426 May. 16,2000.

FIELD OF THE INVENTION

The present invention relates to a rapidly crosslinking liquid fluoropolymer containing the essential components tetrafluoroethylene and at least one compound from the group diiodomethane, 1,2-diiodo-1,1-difluoroethane, 1-iodo-2-bromo-1,1-difluoroethane, 1-bromo-2-iodo-1,1-difluoroethane and/or 1,2-dibromo-1,1-difluoroethane, which has certain portions on the terminal group of the formula —$CH_2$—X where X=Br and/or iodine and iodine/bromine contents in the range 0.05 to 1 wt. % and a certain molecular weight and viscosity, a process for producing it and its use.

BACKGROUND OF THE INVENTION

There is a general wish in the rubber industry for better processability of the rubbers used. This relates in particular to flow properties. The lower the viscosity of the rubber, the easier the processing technology and thus the greater the productivity and the smaller the amount of waste. These aspects are particularly relevant to fluororubbers, as they are expensive rubbers which cannot all be processed in the injection moulding machinery of the rubber industry.

Most fluororubbers with Mooney viscosities ($ML_{1+10}$ at 120° C.) >60 can be processed only by compression- or transfer moulding methods. Fluororubbers with Mooney viscosities of $\leq 60$ can be processed in special injection moulding machines for solid rubbers, but this requires long cycle times and also produces a considerable amount of waste (flash-out).

Rubbers with Mooney viscosities ($ML_{1+10}$ at 120° C.) of 20–60 Mooney units are known, which can be processed into compression mouldings by this principle. The mechanical properties of these rubbers are not noticeably impaired [P. Ferrandez, St. Bowers, Gummi Fasem Kunstst. 48 (1995) 626–633].

A greater reduction of the molecular weight of rubbers, particularly fluororubbers, in order to reduce their viscosity still further impairs the properties of the vulcanised material, in particular the strength. Liquid fluororubbers are known from U.S. Pat. No. 5,852,125. However, the fluororubbers described here have a lower molar mass and a higher iodine content than those disclosed in this application. They are also slower to crosslink.

Furthermore, storage stability is still a problem today with many mixtures. The low-molecular fluororubbers with iodine contents of 1 to 30 wt. % described in U.S. Pat. No. 4361678, for example, which contain a molecular weight regulator of the type Rf/$I_x$, wherein Rf is a perfluorocarbon-, chloroperfluorocarbon- or chlorofluorocarbon group, are not stable during storage. The lack of storage stability is probably due to the fact that the iodine atom in the regulator is bonded to a carbon atom containing at least one fluorine atom, preferably to a chloroperfluorocarbon group, and thus at least half of the resulting terminal groups have the structure —Rf—I, e.g. —$CF_2$—I. The iodine-carbon bond in such groups is particularly labile and iodine can very easily be split off thermally or under the influence of light. This makes the handling of fluoropolymers with high iodine contents very difficult. The reactive groups intended for crosslinking may also react prematurely and the resulting polymeric radicals may recombine. Crosslinked mouldings produced from this material also have poor ageing properties, see V. Arcella et al., Kautsch., Gummi, Kunstst., 44 (1991) 833–837.

According to WO 94/07929, regulators, which contain at least one iodine or bromine atom on a $CH_2$ group, as described e.g. in JP-A 60 221 409 and EP-A 101 930, have the disadvantage that they severely retard polymerisation. Hitherto, they have been used only to produce fluororubbers with high molecular weights or low iodine contents.

Of the non-aqueous processes, polymerisations in the pure liquefied fluoromonomer have proved disadvantageous, as most of the resulting polymers are not soluble in it and also swell only a little. A reproducible polymerisation with good heat and mass transfer and thus acceptable space-time yields is equally impossible by this means.

However, fluoromonomers can be polymerised well in the presence of certain fluorine-containing solvents, see e.g. U.S. Pat. No. 4,243,770, DE-A 196 40 972.1. U.S. Pat. No. 5,182,342 describes the use of fluorocarbons in the presence of up to 20% water as polymerising medium, which fulfill certain criteria with regard to the F/H ratio and the position of the hydrogens. With all compounds of this type, which contain hydrogen and optionally also chlorine, there is always the problem that they may enter into these transfer and/or termination reactions.

In WO-98/15583, 1,1,2-trichlorotrifluoroethane is used as the polymerising medium. However, compounds of this type (chlorofluorocarbons) have considerable ozone-damaging potential and for this reason, their use in industry is prohibited in many industrialised countries. The fluororubbers described in this patent contain 0.5–2.5 wt. % iodine terminal groups.

In the application DE 197 40 633, liquid fluororubbers are produced in inert solvents of the type RF-SO2F or perfluoroalkylsulfone in the presence of a molar mass regulator. The fluororubbers described here also have iodine or bromine terminal groups, but the combination of features in this application and their surprising influence on the crosslinking speed is not mentioned.

Application WO-A-98/15583 describes a liquid fluororubber and a process for producing it. However the combination of features in this application and their surprising influence on the crosslinking speed is not mentioned and the molar masses are too small.

There was thus still a need for liquid fluororubbers, which are pumpable at least at slightly raised temperatures (60–120° C.) and can be processed in conventional thermoplastic processing machines. These liquid fluororubbers should also remain stable during storage and crosslink rapidly and the resulting rubber pieces should have good mechanical and ageing properties, which are very close to those of conventional solid fluororubbers.

SUMMARY OF THE INVENTION

The object of the present invention was therefore to provide fluororubbers which have these properties.

A further object of the invention was to remove, at least partially, the disadvantages of the fluororubbers known from the prior art.

It was found, that fluororubber consisting of the essential components tetrafluoroethylene and at least one compound from the group diiodomethane, 1,2-diiodo-1,1- difluoroethane, 1-iodo-2-bromo-1,1-difluoroethane, 1-bromo-2-iodo-1,1-difluoroethane and/or 1,2-dibromo-1,1-difluoroethane, which has certain portions on the terminal group of the formula —$CH_2$—X where X=Br and/or iodine and iodine and/or bromine contents in the range 0.05 to 1 wt. % and a certain molecular weight and viscosity, solves this problem.

DETAILED DESCRIPTION OF THE INVENTION

The present invention therefore relates to a liquid fluoropolymer which can be produced from tetrafluoroethylene and optionally other fluorine-containing and/or non-fluorine containing monomers and at least one co-compound from the group diiodomethane, 1,2-diiodo-1,1-difluoroethane, 1-iodo-2-bromo-1,1-difluoroethane, 1-bromo-2-iodo-1,1-difluoroethane and/or 1,2-dibromo-1,1-difluoroethane, in which at least 80% of the terminal groups has the formula —$CH_2$—I and/or —$CH_2$—Br and which has a complex viscosity at 100° C. and $\omega=6.3$ $s^{-1}$ of 0.01–30 kpas and a temperature index, calculated as the quotients of the viscosities at 40 and 100° C. of 3–250, characterised in that, the fluoropolymer a) has more than 10 mol % repeated units derived from tetrafluoroethylene, b) contains in the range of 0.05 to 1 wt. % iodine and/or bromine and c) has an average molecular weight (number average Mn) of over 25,000 g/mol.

Fluorine-containing monomers according to the invention are preferably fluorinated, optionally substituted ethylenes, which may contain, besides fluorine, hydrogen and/or chlorine, such as e.g. vinylidene fluoride and chlorotrifluoroethylene, fluorinated 1-alkenes with 2–8 carbon atoms, such as e.g. hexafluoropropene, 3,3,3-trifluoropropene, chloropentafluoropropene, pentafluoropropene, hexafluoroisobutene and/or perfluorinated vinyl ethers of the formula $CF_2$=CF—O—X where X=$C_1$-$C_3$ perfluoroalkyl or —$(CF_2$—CFY—O$)_n$—RF, wherein n=1–4, Y=F or $CF_3$ and RF=$C_1$-$C_3$ perfluoroalkyl.

Non-fluorine-containing monomers according to the invention are preferably ethylene, propene, isobutene or vinyl esters, such as e.g. vinyl acetate.

The fluoropolymer according to the invention is preferably a (co)polymer obtained by (co)polymerisation of a mixture of tetrafluoroethylene, vinylidene fluoride and other fluorine-containing and/or non-fluorine-containing monomers.

The combination of tetrafluoroethylene, vinylidene fluoride, hexafluoropropene and optionally perfluorinated vinyl ethers such as e.g. perfluoro-(methyl-vinyl-ether) is preferred in particular.

The fluoropolymer according to the invention contains more than 10 mol % units derived from tetrafluoroethylene and preferably less than 60 mol % units derived from vinylidene fluoride, and also optionally other fluorine-containing or non-fluorine-containing monomers.

Derived means, that the compounds concerned are used as monomers.

The co-compound is preferably diiodomethane.

The co-compounds can easily be obtained e.g. by adding halogen or interhalogen to vinylidene fluoride.

More than 90% of the terminal groups preferably have the formula —$CH_2$X, where X=iodine or bromine. The iodine and/or bromine content is in the range 0.1 to 1 wt. %, preferably 0.5–1. Iodine is preferred in particular. The iodine and/or bromine is positioned only at the end of the chain.

As was demonstrated by $^{19}$F— and $^1$H NMR spectroscopy, the fluoropolymer according to the invention contains no groups of the formula —$CF_2$—I or >CF—I, from which iodine could be split off particularly easily either thermally or by the influence of light.

The number average of the molecular weights Mn is preferably higher than 25,000 g/mol, in particular higher than 30 000, but always provided that the fluoropolymer has a complex viscosity at 100° C. and $\omega=6.3$ $s^{-1}$ of 0.01 to 30 kpas and a temperature index, calculated as the quotients of the viscosities at 40 and 100° C., of 3 to 250.

In a preferred embodiment of the invention, fillers such as e.g. carbon black, silica, $TiO_2$ (mixture containing filler) and/or crosslinking chemicals, i.e. catalysts and co-crosslinkers (crosslinkable mixtures optionally containing filler), such as e.g. an organic peroxide and a triallyl-isocyanurate (see e.g. EP-A 398 241) or bisamines/bisphenols in combination with phase transfer catalysts and metal oxides as described in A.L. Logothetis, Prog. Polym. Sci., Vol. 14, (1989), 251–296, are added to the fluoropolymer according to the invention.

The fluoropolymers according to the invention or mixtures containing filler produced from them still have a consistency at room temperature similar to that known for solid rubbers, i.e., higher viscosity, the viscosity falling sharply as the temperature rises. At temperatures of 60° C. to 120° C. they have a quasi-liquid consistency. The complex viscosities, measured in a Scher oscillation experiment with a Bohlin rheometer of the type VOR-Melt (cycle frequency $\omega=6.3$ $s^{-1}$), given in kPa s preferably fall into the following characteristic ranges:

| Viscosity, $\omega = 6.3$ $s^{-1}$ [kPa · s] | 40° C. | 100° C. |
| --- | --- | --- |
| Fluoropolymer | 1–100 | 0.01–30 |
| (Fluoropolymer + 30 parts by weight carbon black MTN 990) | 10–200 | 0.1–50 |

Accordingly, the temperature index, calculated as the quotient of the viscosities at 40° C. and 100° C., is preferably 3 to 250 for the fluoropolymer, or 3–300 for the fluoropolymer containing filler (mixture containing filler).

In one embodiment of the invention, the fluoropolymer according to the invention is crosslinked to form rubbery-elastic mouldings. This is preferably done radically, by radiation or using peroxides. The mixtures containing filler and also the crosslinkable mixtures optionally containing filler, can preferably be crosslinked by radiation or using peroxides to form rubbery-elastic mouldings.

The invention also relates to a process for the production of the fluoropolymer according to the invention, in which tetrafluoroethylene is radically polymerised, optionally with another fluorine-containing or non-fluorine-containing monomer in the presence of at least one co-compound containing iodine and/or bromine from the group diiodomethane, 1,2-diiodo- 1,1-difluoroethane, 1-iodo-2-bromo-1,1 -difluoroethane, 1-bromo-2-iodo-1,1-difluoroethane and/or 1,2-dibromo-1,1 -difluoroethane at temperatures of −20° C. to +130° C., preferably +20° C. to +100° C., in the presence of an initiator and/or other auxiliary substances, preferably a redox initiator system.

Polymerisation can be carried out in solution, suspension or emulsion. Polymerisation in aqueous emulsion in the presence of a redox initiator is preferred.

The quantity of co-compound is in the range 0.1 to 1 wt. %, preferably 0.5–1 wt. %, in relation to the fluoromonomers to be reacted.

A solvent with a low transfer constant such as e.g. hexafluorocyclopentane, perfluorohexane, perfluoro (tributylamine) or trichlorotrifluoroethane, can be used as the medium for solution polymerisation.

However a solvent without ozone-damaging potential, such as certain carbon fluoride compounds or fluorocarbon compounds containing fluorocarbon atoms or heteroatoms, such as 1,1,1,3,3-pentafluoropropane, 1,1,1,2,3,3-hexafluoropropane, 1,1,2,2,3,3-hexafluorocyclopentane, 1,1,2,2-tetrafluorocyclobutane, 1-trifluoromethyl-1,2,2-trifluorocyclobutane, 2,3-dihydrodecafluoropentane, 2,2-bis(trifluoromethyl)-1,3-dioxolane, perfluoro(tripropylamine), methoxy-2-hydrohexafluoropropane, methoxynonafluorobutane, perfluorobutane sulfofluoride, perfluorosulfolane and also the compounds of the formula (I) or (II) mentioned in the previous application DE-197 40 633.5,

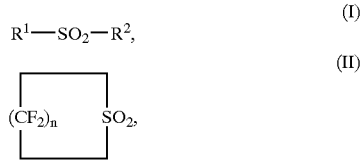

wherein $R^1$ is a fluoroatom or a perfluoroalkyl group containing 1–4 C atoms and $R^2$ is a perfluoroalkyl group containing 1–4 C atoms and n=4 or 5, in particular perfluorobutane sulfofluoride and perfluorosulfolane is preferred for solution polymerisation.

1,1,1,3,3-pentafluoropropane, perfluorobutanesulfofluoride and perfluorosulfolane, alone or in mixture, are preferred.

It is advantageous for the solvents to have low boiling points in order to facilitate separation of the solvent and the fluoropolymer after polymerisation. Because of their low boiling points of 15 to 70° C. and their low enthalpy of evaporation, the preferred compounds mentioned can easily be separated from the rubber after polymerisation by distillation.

The ratio of fluoromonomer (monomer) to solvent and the reactor fill level is preferably chosen in such a way that the proportion of monomer is at least 20 wt. % of the liquid phase at the reaction temperature. The quantity of monomer dissolved in the liquid phase can be determined e.g. from the mass balance on the basis of the partial pressures of the monomer in the gas phase.

Organic or, optionally, fluorinated peroxides such as e.g. tert.-butyl perpivalate, diisopropyl peroxidicarbonate or trifluoroacetyl peroxide or azo compounds such as azo-bis-(isobutyronitrile) or azo-bis(2,4-dimethylvaleronitrile) which are soluble in the monomer or solvent are preferably used as the initiator.

For aqueous emulsion polymerisation, fluorinated emulsifiers, such as for example the salts of $C_6$–$C_{12}$ perfluorocarboxylic or sulfonic acids which are soluble in water, are used in concentrations of 0.05 to 2 wt. % as auxiliary substances to stabilise dispersion. Examples of these are sodium- or ammonium salts of perfluorooctanoic acid and the lithium salt of perfluorooctylsulfonic acid.

Inorganic peroxides, such as e.g. peroxidisulfates, perborates, percarbonates, generally in the form of their potassium, sodium or ammonium salts can also be used as initiators, preferably in combination with reducing agents. The following can be used as reducing agents: sulfur compounds, such as sodium sulfite, sodium pyrosulfite or Rongalit C (sodium formamidine sulfinic acid), other organic reducing agents, such as ascorbic acid, metal salts, such as iron-(II)- or cobalt-(II)-salts, metalorganic compounds etc. A system consisting of at least one manganese compound in oxidation stages $\geq 3$ and optionally a reducing agent, such as e.g. carboxylic acids, dicarboxylic acids, polyvalent alcohols and hydroxycarboxylic acids is preferred as the redox initiator system.

The fluoropolymers according to the invention can be produced in batches, but preferably by semi-continuous or continuous processes.

Production is carried out under autogenic pressure, which is set depending on the reactor fill level, temperature and monomer quantities.

The invention also relates to the use of the fluoropolymers according to the invention for the production of coatings or for polymer-analogous reactions for the substitution of iodine or bromine groups preferably by other reactive groups. The mixtures containing filler, or crosslinkable mixtures optionally containing filler, can be used for the production of coatings or for polymer-analogous reaction for the substitution of iodine- or bromine groups by other reactive groups by means of nucleophilic or radical substitution.

The iodine- and bromine groups are preferably substituted by reaction with compounds, which contain primary or secondary amino groups, allyl- or vinyl groups and alkylatable aromatic groups.

The invention also relates to a process for the production of fluoro-elastomeric mouldings and/or coatings, according to which fluoropolymers with a viscosity-temperature index at 40/100° C. of 3 to 250, at temperatures of 40 to 250° C. under pressure, preferably 20 to 200 bar, are injection moulded in moulds heated to 100 to 250° C., preferably 120 to 200° C. in which they are then crosslinked.

Injection moulding is carried out in commercial injection moulding- or piston-type metering machines as described e.g. in Comprehensive Polymer Science, Vol. 7 (1989) p. 356. The fluoropolymer is preferably fed into the thermoplastic injection moulding- or piston-type metering machine heated to a temperature of 40 to 250° C. Heated metering and feeding machines are particularly suitable for this, preferably heated feeder piston pumps.

The fluoropolymers according to the invention or a mixture of several fluoropolymers according to the invention, optionally in the presence of other liquid rubbers are preferably used as fluoropolymers.

Mixtures containing filler or crosslinkable mixtures optionally containing filler, can also be used.

The improved flowability makes it possible to use crosslinking chemicals or chemicals which activate/initiate crosslinking, such as e.g. peroxides, bases or initiators with increased reaction speeds. These produce a crosslinking curve in the rheometer at half-times for 50% increase of the shear modulus, called t50, of 1 to 20 minutes at 100° C.

The fluoropolymers can be crosslinked in the moulds heated to 100 to 250° C. e.g. directly via the terminal iodine or bromine atoms as reactive groups. This may be done by the usual radical method using substances which form radicals, such as organic peroxides or by nucleophilic substitution of the terminal iodine, for example by means of a polyfunctional amines.

To produce the mouldings, the fluoropolymer mixtures are injection moulded at temperatures of 40 to 250° C. under pressure, preferably 20 to 400 bar, in moulds heated to 100 to 250° C., preferably 120 to 220° C., in which they are then radically crosslinked. Injection moulding is carried out in commercial thermoplastic injection moulding- or piston-type metering machines.

Furthermore, the terminal iodine atoms can also be replaced by other reactive groups and then crosslinked. Nucleophilic substitution reactions for example, such as amination or saponification can be used for this. Terminal C—C double bonds can be introduced e.g. by radical addition, and subsequent elimination, of allyl acetate.

The fluoropolymer according to the invention is unusual in that it can be used with the advantageous technology of liquid rubber processing to produce crosslinked mouldings or coatings and forms networks at a surprisingly rapid crosslinking speed.

Hitherto, it has only been possible to use the combination of good flowability and extraordinarily high crosslinking speeds for covalently cross-linked elastomers to reduce production cycle times when producing elastomeric mouldings from liquid silicon rubbers.

The following examples explain the invention but are not intended to restrict it.
Embodiments:

EXAMPLES
Standards/Conditions/Notes

| Test | Conditions | Notes |
| --- | --- | --- |
| composition of the fluoropolymer | $^{19}$F NMR; solvent acetone; standard CFCl$_3$ | mol % VDF, TFE, HFP |
| molecular weight Mn | GPC in DMAC produces Mn relative to the PMMA standard. The absolute Mn is calculated with the aid of a calibration curve produced by membrane osmosis | number average of the molecular weight Mn |
| iodine content | elementary analysis | wt. % iodine |
| Viscosity | Scher oscillation experiment in Bohlin Melt-VOR at 40 and 100° C. and cycle frequency 6.3 s$^{-1}$ | viscosity variation with temperature |
| Vulcameter | Monsanto rheometer MDR 2000E at 170° C. to DIN 53529 | crosslinking speed as time between t$_{s1}$ (vulcanisation point) and t$_{90}$ (90% of the maximum torque) |

Examples 1–8, Examples 3–5 of which are According to the Invention 1155 g 1,1,1,3,3-pentafluoropropane (PFP), 0.3 g t-butylperoxy-2-ethythexanoate (TBPEH) and diiodomethane (DIM) was placed in a 4,1-1- autoclave (Table 1). The closed autoclave is evacuated twice whilst cooling, then loaded to 3 bar nitrogen pressure and stirred slowly for ten minutes. Vinylidene fluoride (VDF), hexafluoropropene (HFP) and tetrafluoroethylene (TFE) (Table 1) were added to the evacuated autoclave and the reaction mixture was heated to 80° C. whilst stirring.

Polymerisation began after approximately two hours, as indicated when the pressure began to fall. During polymerisation a monomer mixture was injected in in such a way that the internal pressure of the autoclave remained constant. A total of 600 to 1000 g monomer mixture were added in this way (Table 1). In addition, after three hours of polymerisation, 19.9 ml, and after 300 g and 600 g conversion, 12.4 ml of an initiator solution (50 g.1-1 TBPEH in PFP) was added to the reactor.

Once polymerisation was complete, the reaction mixture was cooled and the non-unconverted monomer mixture was removed from the reactor by release and evacuation.

After turning off the stirrer, the content of the reactor was run off into a second pressurised container positioned underneath, through a bottom outlet valve. After separating the fluoropolymer product from the PFP, it was dried (Table 1). The analysis results of the fluoropolymer products are given in Table 2.

The fluoropolymers were mixed in a two-roll rubber mixer to form crosslinkable mixtures of the following composition:

| 100 parts fluoropolymer: | from examples 1–8 |
| --- | --- |
| 30 parts carbon black MTN 990 | |
| 3 parts Ca(OH)$_2$ | |
| 4 parts Perkalink 301-50 = | 50 wt. % triallylisocyanurate on inert filler |
| 3 parts Luperco 101-XL-45 = | 45 wt. % 2,5-dimethyl-2,5-di(t-butylperoxy)hexane on inert filler |

Vulcanisation of the fluoropolymers mixture was examined on a Monsanto MDR2000E rheometer at 170° C. The time between t$_{sl}$ (vulcanisation point) and t$_{90}$ (90% of maximum torque) served as a measure of the crosslinking time (Table 3): the shorter the time, the faster the crosslinking process.

TABLE 1

Quantities used for polymerisation.

| Example | VDF added/ g | HFP added/ g | TFE added/ g | DIM added/ g | VDF metered/ g | HFP metered/ g | TFE metered/ g |
| --- | --- | --- | --- | --- | --- | --- | --- |
| 1 | 353 | 1342 | 45 | 18 | 542 | 323 | 130 |
| 2 | 353 | 1350 | 48 | 16 | 530 | 332 | 138 |
| 3 | 144 | 1709 | 136 | 8 | 360 | 370 | 268 |
| 4 | 144 | 1708 | 137 | 9 | 364 | 378 | 262 |
| 5 | 144 | 1710 | 135 | 10 | 369 | 377 | 276 |
| 6 | 144 | 1711 | 134 | 13 | 359 | 378 | 267 |
| 7 | 143 | 1719 | 135 | 18 | 361 | 381 | 262 |
| 8 | 448 | 1044 | 0 | 12 | 353 | 235 | 0 |

TABLE 2

Properties of the fluoropolymers

| Ex | Mol % VDF | Mol % HFP | Mol % TFE | wt. % iodine | Mn kg/mol | Viscosity at 40° C./ Pa · s | Viscosity at 100° C./ Pa · s | Ratio of viscosities 40° C.:100° C. |
|---|---|---|---|---|---|---|---|---|
| 1 | 70.6 | 19.4 | 10.0 | 1.5 | 20.37 | 15800 | 216 | 73 |
| 2 | 68.7 | 20.1 | 11.2 | 1.4 | 21.97 | 14600 | 248 | 59 |
| 3 | 54.0 | 20.2 | 25.8 | 0.9 | 31.98 | 45300 | 1420 | 32 |
| 4 | 53.8 | 21.0 | 25.2 | 0.8 | 29.56 | 41000 | 976 | 42 |
| 5 | 54.3 | 21.8 | 23.9 | 0.9 | 27.94 | 34500 | 630 | 55 |
| 6 | 53.7 | 20.7 | 25.6 | 1.2 | 22.58 | 18400 | 207 | 89 |
| 7 | 53.9 | 21.2 | 24.8 | 1.7 | 17.66 | 7610 | 63 | 121 |
| 8 | 77.9 | 22.1 | 0.0 | 1.4 | 16.57 | 10900 | 128 | 85 |

TABLE 3

Properties of the vulcanised fluoropolymer

| Example | S'min/dNm | S'max/dNm | $t_{s1}$/min | $t_{90}$/min | $t_{90} - t_{s1}$/min |
|---|---|---|---|---|---|
| 1 | 0.01 | 19.83 | 0.64 | 5.56 | 4.92 |
| 2 | 0.02 | 20.33 | 0.62 | 5.49 | 4.87 |
| 3 | 0.04 | 21.18 | 0.57 | 2.37 | 1.80 |
| 4 | 0.04 | 22.02 | 0.58 | 2.56 | 1.98 |
| 5 | 0.03 | 20.30 | 0.60 | 2.65 | 2.05 |
| 6 | 0.02 | 24.41 | 0.58 | 3.91 | 3.33 |
| 7 | 0.01 | 23.76 | 0.62 | 4.93 | 4.31 |
| 8 | 0.02 | 9.87 | 0.81 | 7.27 | 6.46 |

What is claimed is:

1. A process for producing liquid fluoropolymers comprising polymerizing, in a non-aqueous solvent without ozone damaging potential, tetrafluoroethylene and optionally other fluorine-containing and/or non-fluorine-containing monomers and at least one compound selected from the group consisting of diiodomethane, 1,2-diiodo-1,1-difluoroethane, 1-iodo-2-bromo-1,1-difluoroethane, 1-bromo-2-iodo-1,1-difluoroethane and/or 1,2-dibromo-1,1-difluoroethane, in which at least 80% of the terminal groups in the liquid fluoropolymer have the formula —CH$_2$—I and/or —CH$_2$—Br and liquid fluoropolymer has a complex viscosity at 100° C. and ω=6.3 s$^{-1}$ of 0.01 to 30 kPas and a temperature index, calculated as the quotients of the viscosities at 40 and 100° C. of 3 to 250, wherein, the liquid fluoropolymer has a) more than 10 mol % repeated units derived from tetrafluoroethylene, b) a content of iodine and/or bromine in the range of 0.05 to 1 wt. % and c) an average molecular weight (number average Mn) of over 25,000 g/mol, and wherein the non aqueous solvent is selected from the group consisting of 1,1,1,3,3-pentafluoropropane, perfluorobutane sulphofluride, perfluorosulpholane and a mixture thereof.

2. The process according to claim 1, wherein the polymerization is carried out in the presence of an initiator and/or other auxiliary substances at temperatures of −20 to +130° C.

* * * * *